Feb. 24, 1970  C. B. GREENBERG  3,497,809
MICROPHONE-EARPHONE ASSEMBLY FOR COMBINATION
RADIO TRANSMITTING-RECEIVING DEVICES
Filed July 3, 1967

United States Patent Office 3,497,809
Patented Feb. 24, 1970

3,497,809
MICROPHONE-EARPHONE ASSEMBLY FOR COMBINATION RADIO TRANSMITTING-RECEIVING DEVICES
Carl B. Greenberg, New York, N.Y., assignor to ACR Electronics Corp., New York, N.Y., a corporation of New York
Filed July 3, 1967, Ser. No. 650,837
Int. Cl. H04b 1/38
U.S. Cl. 325—16                    2 Claims

ABSTRACT OF THE DISCLOSURE

A combination microphone-earphone assembly adapted to be attached to a portable transmitting-receiving device using a common transducer for transmitting and receiving functions, whereby the device may be held in constant position when changing functions.

---

This invention relates generally to the field of portable communications devices, and more particularly to an improved microphone-earphone assembly which may be conveniently attached to existing receiver-transmitter devices using a common sound input and out put transducer, such devices being commonly referred to as "walkie talkies".

It has been found that under certain combat conditions, existing devices which do not have a volume control, upon receiving communication will transmit the same at excessive volume, which will often disclose the position of the listener located in enemy territory. Further, owing to the fact that a single transducer is employed for both receiving and transmitting functions, it is often necessary to shift the position of the device with respect to the user many times during the couse of a single conversation. This movement is not only inconvenient, but often difficult where the listener is lying in a prone position or other position necessitated by cramped confines.

It is accordingly among the principal objects of the present invention to provide a combination microphone-earphone assembly which may be conveniently attached to existing transmitting-receiving devices, whereby the above mentioned disadvantages may be substantially eliminated.

Another object of the invention lies in the provision of an improved microphone-earphone assembly which may include means for preventing excessively loud reception from being transmitted a distance greater than that required for convenient listening by the user.

Yet another object of the invention lies in the provision of an improved microphone-earphone assembly which may be conveniently attached to existing transmitting-receiving devices.

A further object of the invention lies in the provision of an improved microphone-earphone assembly incorporating a flexible piece which may be pressed against the mouth of the user to prevent escape of incoming audible signals, and permit the user to speak effectively in muted tones.

A feature of the invention lies in the fact that it may be conveniently installed and removed without resort to special tools, and with use of only ordinary skill.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
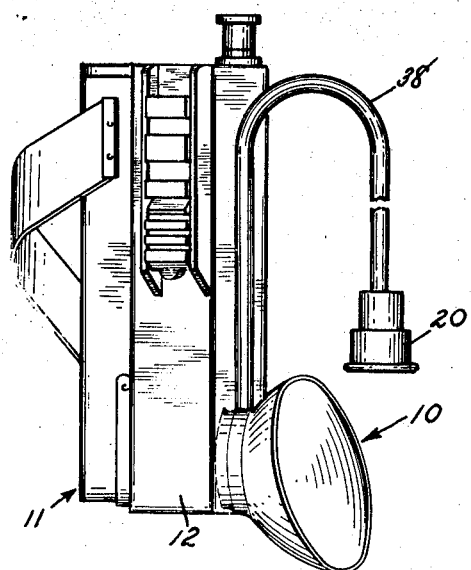
FIGURE 1 is a side elevational view of an embodiment of the invention.
Figure 2:
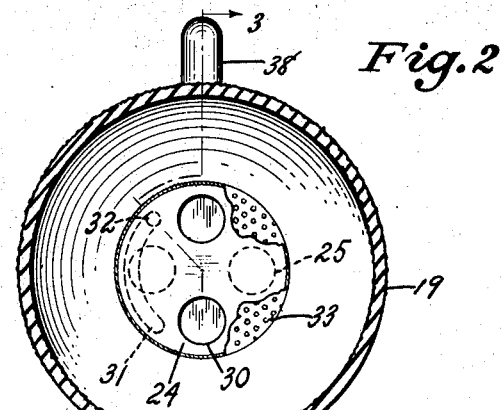
FIGURE 2 is an enlarged view in elevation, partly broken away to show detail of the embodiment in detached condition.

In accordance with the invention, the device, generally indicated by reference character 10, is illustrated in FIGURE 1 in the drawing in attached condition with respect to a transmitting-receiving device 11, well known in the art, and currently in use by the armed forces. The device 11 includes a casing element 12 enclosing a transducer 13 capable of selectively performing the functions of a microphone and an earphone. The transducer 13 is maintained in position within the device by means of a threaded ring (not shown) which is replaced upon installation of a device 10, which performs a similar function. This ring engages a threaded orifice 15 (FIGURE 3) in the casing, and serves to maintain the same against a surface 14, in which position it may be connected to electronic components of the device 11 (not shown).

The device 10 includes a hollow threaded body element 16 which may be formed of brass, synthetic resinous material, or the like, as well as a rotary valving element 17, an earpiece element 19, a mouth piece element 20, and mouthpiece element connecting means 21.

The body element 16 includes a cylindrical wall 22 having a threaded end 23 engaging the orifice 15 and a planar wall 24 defining a pair of eccentrically disposed orifices 25 and a centrally disposed orifice 26 supporting the valving element 17.

The valving element includes a shaft 27 engaged within the orifice 26 mounting at one end thereof a retaining member 28, and at an opposite end thereof a correspondingly orificed member 24 having orifices 30 which are selectively alignable with the orifices 25 by manually rotating the member 28 on the peripheral surfaces 28a thereof, which are preferably knurled to facilitate manual engagement. An arcuate slot 31 cooperates with a limiting pin 32 which permits rotation of the member 28 over a 90 degree arc.

Superimposing the openings 30 is a screen member 33 and disposed beneath the screen member is a plastic sheet 34 which prevents the entry of dirt or other foreign material during use.

Figure 3:
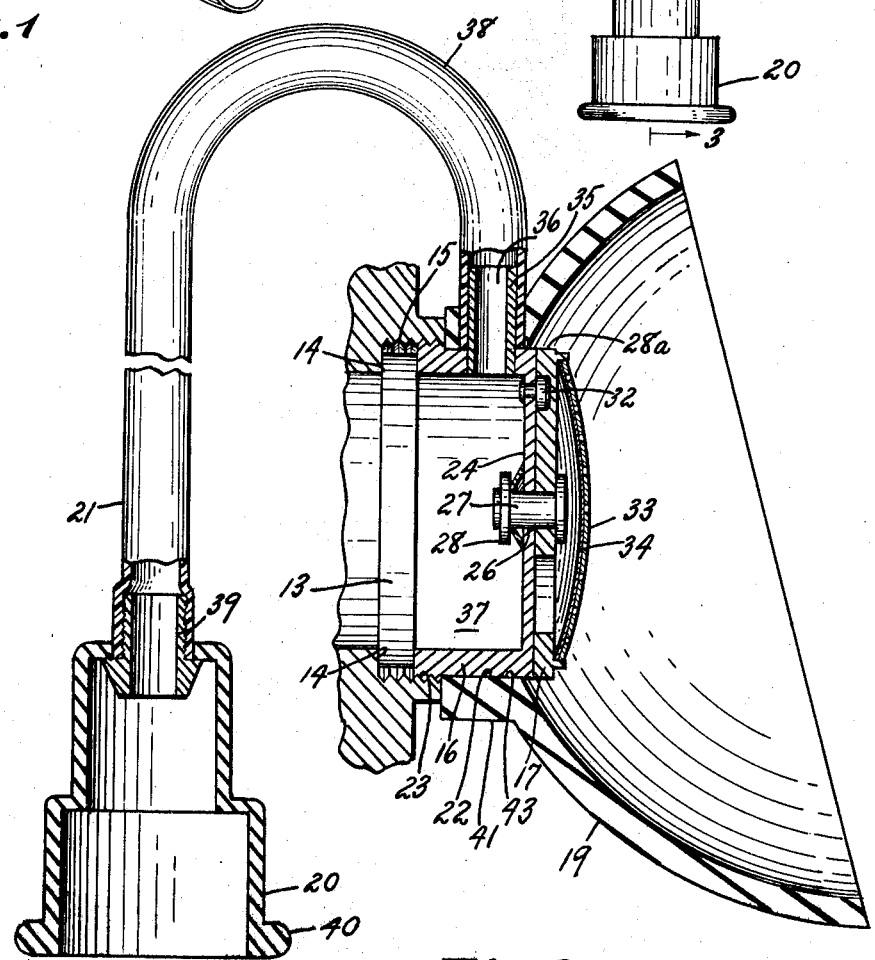
FIGURE 3 is a fragmentary enlarged vertical sectional view as seen from the plane 3—3 in FIGURE 2.

The mouthpiece element connecting means 21 includes a metallic fitting 35 which penetrates the cylindrical wall 22 as best seen in FIGURE 3. The fitting 35 includes a centrally disposed bore 36 which communicates with the chamber 37 defined by the body element 16. The outwardly extending portion of the fitting 35 is connected to a synthetic resinous tube 38 leading to a tubular metallic fitting 39 in the mouthpiece element 20.

The mouthpiece element 20 may be of any desired configuration, preferably provided with an annual flange 40 to facilitate engagement with the mouth of a user.

The earpiece element 19 is preferably formed of a soft resilient material such as rubber, and includes a cylindrical flange 41 adapted to engage the outer surface of the wall 22 to be maintained in the position shown in FIGURE 3. An opening 43 accommodates the metallic fitting 35, which incidently prevents the earpiece element from becoming lost. The peripheral edge 44 is sufficiently soft so as to permit the same to engage the head of the user, and effectively block the loss of sound waves passing therethrough to the transducer.

In use, the device 10 is installed upon the device 11, and a suitable adjustment is made of the valving element 17. Owing to the relatively small size of the orifices 25, even with the valve adjustment maximum, a considerable reduction in the amount of sound waves passing through the earpiece element will be immediately accomplished. By placing the peripheral edge of the mouthpiece element near the mouth, any leakage of sound therethrough is effectively reduced. Thus, when using the device 11 under controlled conditions in which evidence of communication must be concealed, the device 10 is conveniently installed to permit operation at a lower audible level, while incidently eliminating the necessity of shifting the device 10 between the mouth and ear of the user upon a change of function.

I wish it to be understood that I do not consider the invention limited to the precise details of structure shown and set forth in this specification, for obvious modifications will occur to those skilled in the art to which the invention pertains.

I claim:

1. As a new article of manufacture, for use with a portable radio transmitter-receiver of a type having a selectively employed common sound transducer for receiving and transmitting communication, a microphone-earpiece assembly comprising: an arcuate hollow body having first and second ends, threaded means for attaching said body to said transmitter-receiver at one end thereof in the area of said transducer to form a sealed engagement therewith, rotary type valving means disposed at said second end of said body for variably regulating the passage of sound therethrough, and mouthpiece means connected to said body between said valving means and said attaching means, said mouthpiece means being cup-shaped and surrounding said valving means.

2. Structure in accordance with claim 1, having flexible earpiece means interconnected to said body between said transducer and said valving means.

References Cited
UNITED STATES PATENTS

| | | | |
|---|---|---|---|
| 737,345 | 8/1903 | Chalkley | 179—104 |
| 1,040,775 | 10/1912 | Schanandoah | 181—20 |
| 1,646,628 | 10/1927 | Nolen | 179—182 |
| 1,752,498 | 4/1930 | Mathes | 179—1 |
| 2,904,640 | 9/1959 | Dreher et al. | 179—156 |
| 3,345,568 | 10/1967 | Errichiello | 325—16 |

ROBERT L. GRIFFIN, Primary Examiner

B. V. SAFOUREK, Assistant Examiner

U.S. Cl. X.R.

179—103; 181—20; 325—18